US006249094B1

(12) United States Patent
Zeh et al.

(10) Patent No.: US 6,249,094 B1
(45) Date of Patent: Jun. 19, 2001

(54) METHOD AND APPARATUS FOR DETERMINING THE ROTOR POSITION OF SYNCHRONOUS MOTORS

(75) Inventors: Stefan Zeh, Leutkirch; Martin Weinmann, Bad Waldsee, both of (DE)

(73) Assignee: Diehl AKO Stiftung & Co. KG., Wengen (DE)

( * ) Notice: Subject to any disclaimer, the term of this patent is extended or adjusted under 35 U.S.C. 154(b) by 0 days.

(21) Appl. No.: 09/398,576

(22) Filed: Sep. 17, 1999

(30) Foreign Application Priority Data

Oct. 10, 1998 (DE) .............................. 198 46 831

(51) Int. Cl.[7] ...................................................... H02P 1/18
(52) U.S. Cl. ........................... 318/254; 318/138; 318/439
(58) Field of Search .................................. 318/254, 439, 318/138

(56) References Cited

U.S. PATENT DOCUMENTS

| | | | |
|---|---|---|---|
| 4,480,218 | * 10/1984 | Hair | 318/696 |
| 4,642,537 | * 2/1987 | Young | 318/254 |
| 5,327,053 | * 7/1994 | Mann et al. | 318/254 |
| 5,569,994 | * 10/1996 | Taylor et al. | 318/700 |
| 5,841,252 | * 11/1998 | Dunfield | 318/254 |
| 5,847,523 | * 12/1998 | Rappenecker et al. | 318/434 |
| 5,929,577 | * 7/1999 | Neidorff et al. | 318/254 |

FOREIGN PATENT DOCUMENTS 195 27 982
A1   2/1997 (DE).

OTHER PUBLICATIONS

B. Maurice, J.M. Bourgeois, Bernhard Sasby; SGS–Thompson, "Digitale Steuerung eines Dreiphansen–Induktionsmotors" (Apr. 7), 1992, pp. 40, 41, 42 and 46.
Pierre Voultoury and Jack Kilby, "Sonsorless Speed Controlled Brushless DC Drive usint the TMS320C242 DSP Controller", (May 1998), pp. 169, 170–180.

* cited by examiner

*Primary Examiner*—Robert E. Nappi
*Assistant Examiner*—Rina I. Duda
(74) *Attorney, Agent, or Firm*—Scully, Scott, Murphy & Presser

(57) ABSTRACT

Described is a method of determining the rotary position of the rotor of a synchronous motor, in relation to the rotating magnetic stator field. The instantaneous rotor position is ascertained by measurement of the emf (E.s) induced in at least one stator winding by the rotor in a current gap in the stator current (I.s) flowing through said stator winding, wherein in accordance with the invention when using a sinusoidal or quasi-sinusoidal stator current an artificial current gap in the stator current is produced. In that case the induced emf (E.s) is directly derived from the tapped-off terminal potential (U.s) of the respective stator winding.

10 Claims, 7 Drawing Sheets

METHOD AND APPARATUS FOR DETERMINING THE ROTOR POSITION OF SYNCHRONOUS MOTORS

BACKGROUND OF THE INVENTION

1. Field of the Invention

The present invention concerns a method of determining the rotor position of synchronous motors, in particular multi-phase synchronous motors, for regulating the synchronous motors to optimum efficiency, as set forth pursuant to the present disclosure, a method of detecting a zero passage of a stator current changing in sign of a synchronous motor, as set forth in the disclosure.

2. Discussion of the Prior Art

Electronically commutated synchronous machines or motors which are operated on a dc voltage network or which are converter-fed are known from the literature and various situations of use in a practical context. Synchronous motors are also increasingly coming into use in the sector of low rotary speed dynamics as for example in connection with pumps, condensers or washing machines. Besides the high level of starting torque, synchronous motors have the advantage over asynchronous motors inter alia that they can be operated with larger air gap tolerances, thereby affording structural advantages such as for example the direct drive for the washing drum in washing machines or pumps and condensers with a wet rotor.

It is known that, in the case of synchronous motors, an optimum torque and thus an optimum level of efficiency are achieved if the vector of the magnetic flux $\phi_R$ produced by the rotor is perpendicular to the vector of the magnetic flux $\phi_S$ generated by the respective stator winding, that is to say if the magnetic field of the rotor is oriented in perpendicular relationship to the magnetic field of the respective stator winding. That arises out of the fact that the torque vector T is proportional to $\phi_R \times \phi_S$ or the magnitude of the torque vector T is proportional to $\sin\alpha$, wherein $\alpha$ is the spatial setting angle between the two magnetic fluxes $\phi_R$ and $\phi_S$. In this case the rotor of the synchronous motor is so-to-speak pulled along by the rotating stator rotary field.

As the magnetic flux $\phi_R$ generated by the rotor is determined directly by the position of the rotor, synchronous motors can be regulated for example by detection of the position of the rotor in relation to the rotating stator field. In that respect, it is known from the state of the art to provide at the rotor shaft of the synchronous motor sensors which establish the position of the rotor at any moment in time. A regulating apparatus of that kind is known for example from DE-A1 195 27 982 in which detection of the position, speed of rotation and/or direction of rotation of the rotor is effected by the use of stationarily mounted, magnetosensitive sensors, the measurement signals of which are fed to the electronic control system.

It is also known to manage without sensors of that kind when regulating synchronous motors. If the stator winding is acted upon by a so-called gappy current, that is to say in particular a current of staircase-shaped or rectangular configuration with phases in which the current is constantly zero, it is possible, in those so-called current gaps, to detect the voltage which is induced by the rotation of the rotor in the stator winding and which is also referred to briefly as the emf as potential applied to the corresponding motor terminal, and to obtain therefrom information about the position of the rotor. Regulation of the synchronous motor is then effected in such a way that emf in the middle of the current gap should have a zero passage. In that case the control value for regulation is either the frequency with which the stator field is switched or the amplitude of the stator current. Such a method of regulating synchronous motors is described for example in detail in "Sensorless Speed Controlled Brushless DC Drive using the TMS320C242 DSP Controller" by P. Voultoury, Intelligent Motion, May 1998 Proceedings, pages 169–180.

At certain rotary speeds as are required for example in the case of synchronous motors for washing machines or dryers, the use of a gappy stator current however involves undesirable clicking or chattering which is generally not acceptable to a customer. That noise is evidently caused by the fact that the stator windings are acted upon in a pulse-like manner by the pulses of the gappy current, in which case the frequencies which occur here are in the audible range.

It is therefor already known for troublesome noises of that kind to be avoided in the case of synchronous motors by a procedure whereby, in those rotary speed ranges, instead of the gappy current, a sinusoidal or quasi-sinusoidal stator current is used. A quasi-sinusoidal stator current of that kind is produced by the power switches of the three-phase bridge of synchronous motor being operated with pulses which are controlled in pulse width modulated (PWM) manner in such a way that a quasi-sinusoidal stator current is produced. Production of the quasi-sinusoidal stator current by PWM-actuation is described in greater detail for example in "Digitale Steuerung eines Dreiphasen-Induktionsmotors" ("Digital Control of a Three-Phase Induction Motor") by B. Maurice et al in Design & Electronik 8 of 07.04.1992, pages 40–46. In this case the control circuit has recourse to stored tables with values for the pulse duty factors of the bridge arms of the synchronous motor.

Due to the use of a quasi-sinusoidal stator current however it is no longer possible to measure the emf induced in the stator windings and to use the measurement result for regulation of the synchronous motor, as was the case when using the gappy current.

SUMMARY OF THE INVENTION

Therefore the object of the present invention, in a synchronous motor, when using a quasi-sinusoidal or sinusoidal stator current, is to provide a possible way of detecting the position of the rotor without the use of sensors, and in particular measuring the emf induced in the stator windings in order to regulate the synchronous motor to optimum efficiency by means of those measurement values.

By virtue of the actually sinusoidal or quasi-sinusoidal stator current being set to zero for a certain period of time, that is to say, an artificial current gap is produced, it is possible—similarly as in the case of the gappy stator current—to measure in that current gap the voltage induced in the stator winding by virtue of the rotation of the rotor—the emf—and in particular to measure the phase position between the induced emf and the stator current. Regulation of the synchronous motor is then effected in such a way that the emf induced in the stator winding and the stator current are in phase as, in that case, the greatest possible torque is achieved. The duration of the current gap is in that case kept very short in relation to the period duration of the quasi-sinusoidal stator current in order not to have an adverse influence on the drive of the synchronous motor.

Preferably the current gap in the quasi-sinusoidal stator current is provided in the proximity of and in particular after recognition of a zero passage of the stator current as in that case the current can be switched off to the value zero more quickly than in other regions of the quasi-sinusoidal current configuration with higher absolute values in respect of the stator current.

In this case detection of a zero passage of the stator current is advantageously effected by detecting the terminal potentials during so-called dead times in actuation of the corresponding stator winding. By comparison of the successively detected terminal potentials, upon a change in the terminal potential it is possible to detect a zero passage of the stator current between the respective dead times.

Detection of the respective terminal potential is preferably effected by a procedure whereby, during the artificially produced current gap in the stator current in one stator winding, the other stator windings are short-circuited and the emf induced in the one stator winding, in the current gap, is detected by measurement of the terminal potential of the corresponding stator winding in relation to the common terminal potential of the other stator windings. In a preferred embodiment in this respect the short-circuiting stator windings are connected to the negative pole or the positive pole of the voltage intermediate circuit.

A further object of the present invention is to provide a method of detecting a zero passage of stator current without the use of current sensors so that it is easily possible to provide the artificial current gap for detecting the position of the rotor without the use of sensors in accordance with the above-described method in the proximity of a current zero passage.

In the method of detecting a zero passage of a stator current which changes in sign of a synchronous motor the terminal potential is detected during successive dead times of actuation of the corresponding stator winding; the comparison of the terminal potentials detected during two dead times is used to detect a zero passage of the stator current between the two dead times if the terminal potential has changed.

Still another object of the present invention is to provide an apparatus for carrying out the above-indicated methods.

In accordance with the invention, when using a sinusoidal or quasi-sinusoidal stator current at least one motor terminal and preferably all motor terminals, for detection of the terminal potential of the associated stator winding, are connected to the motor control so that the terminal potential can be used as a regulator input parameter for regulation of the synchronous motor.

BRIEF DESCRIPTION OF THE DRAWINGS

The invention is described in greater detail hereinafter by means of a preferred embodiment with reference to the accompanying drawing in which.

DETAILED DESCRIPTION OF PREFERRED EMBODIMENTS

As a basis for the following considerations, the equivalent-circuit diagram of a single-phase synchronous motor will first be described with reference to FIG. 1. The stator winding of a synchronous motor respectively has a line resistance R.s and a line inductance L.s. The voltage U.s in the form of an ac voltage is applied to the stator winding by a converter. In addition, a voltage E.s which is also briefly identified as emf is induced in the stator winding by the rotor which for example has a permanent magnet.

Figure 1:
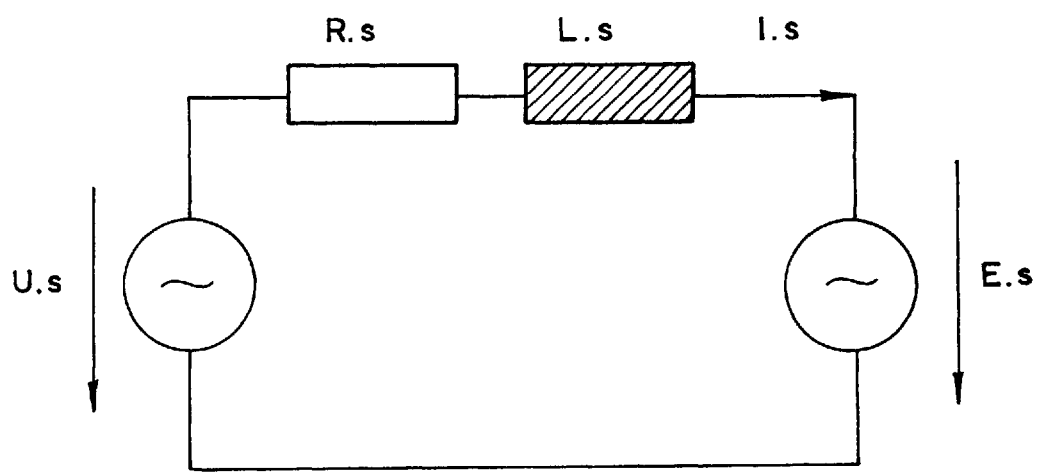
FIG. 1 shows the equivalent-circuit diagram of a single-phase synchronous motor.
Figure 2:
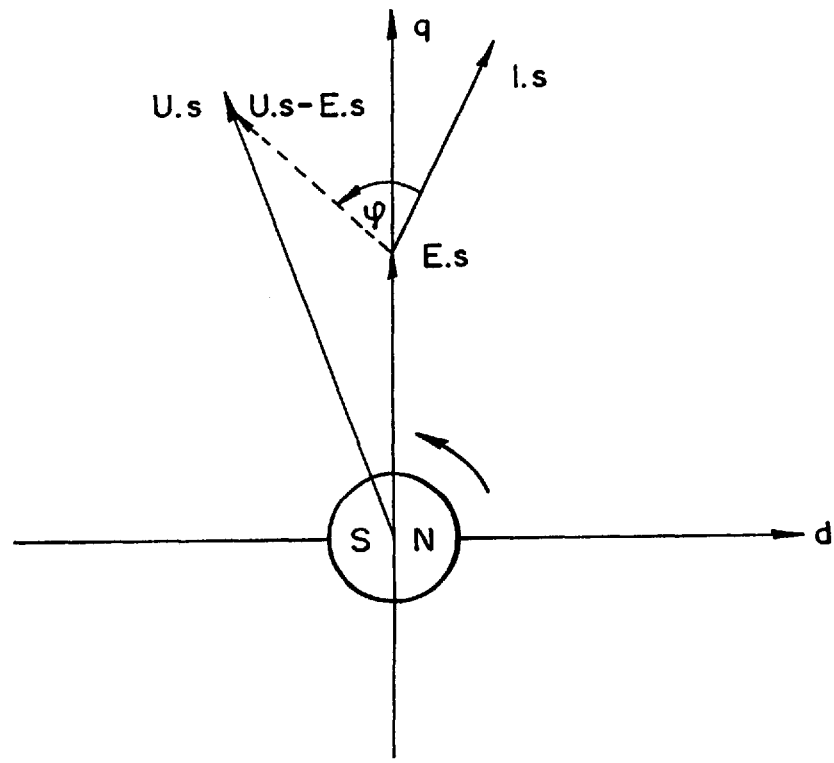
FIG. 2 shows a vector diagram of the electrical parameters shown in FIG. 1.

FIG. 2 shows the electrical parameters illustrated in FIG. 1 and the relationships thereof in the form of a vector diagram. The vector diagram in FIG. 2 is rotor flux-oriented, that is to say the d-axis always points in the direction of the magnetic flux $\phi_R$ of the rotor. The q-axis is in leading relationship through 90° relative to the d-axis. By virtue of the induction law (induced voltage E.s is proportional to the differential quotient of the magnetic flux in relation to time $d\phi_R/dt$) the emf induced in the stator winding is always on the q-axis, that is to say it leads the magnetic flux $\phi_R$ of the rotor by 90°.

The voltage U.s applied to the stator winding is shown by way of example for a given point of operation. The alternating current I.s lags by the angle $\phi$ behind the voltage (U.s–E.s) effectively applied to the stator winding. The angle $\phi$ results from the motor characteristic parameters and the considered rotary speed $\omega$ of the rotor in accordance with $\phi = \arctan(\omega \cdot L.s / R.s)$.

The invention is now based on the realisation that the point of operation of the synchronous motor with the optimum level of efficiency, that is to say with the greatest torque, is that at which the current I.s flowing in the stator winding and the emf E.s induced in the stator winding are in phase.

That arises on the one hand out of the fact that, as already set forth in the preamble to the description, the greatest torque exists when the magnetic flux of the rotor $\phi_R$ and the magnetic flux of the stator winding $\phi_S$ are perpendicular to each other. In addition, with a sinusoidal configuration in respect of the rotor flux $\phi_R$ the induced emf E.s leads the magnetic flux of the rotor $\phi_R$ by 90°, as described above with reference to FIG. 2. In addition. in the case of a sinusoidal stator current I.s on the one hand the applied voltage U.s leads the current I.s flowing in the stator winding by 90° (U.s proportional to dI.s/dt) and on the other hand the applied voltage U.s leads the magnetic flux of the stator $\phi_S$ by 90° (U.s proportional to $d\phi_S/dt$). The above-indicated relationship between optimum efficiency and phase position as between I.s and E.s follows from those three prerequisites set forth above.

An embodiment of a circuit arrangement will now be described with reference to FIG. 3 while reference will be made to FIGS. 4 to 6 to describe the method of determining the instantaneous rotational position of the rotor of a synchronous motor in relation to the rotating magnetic stator field in accordance with the present invention.

Figure 3:
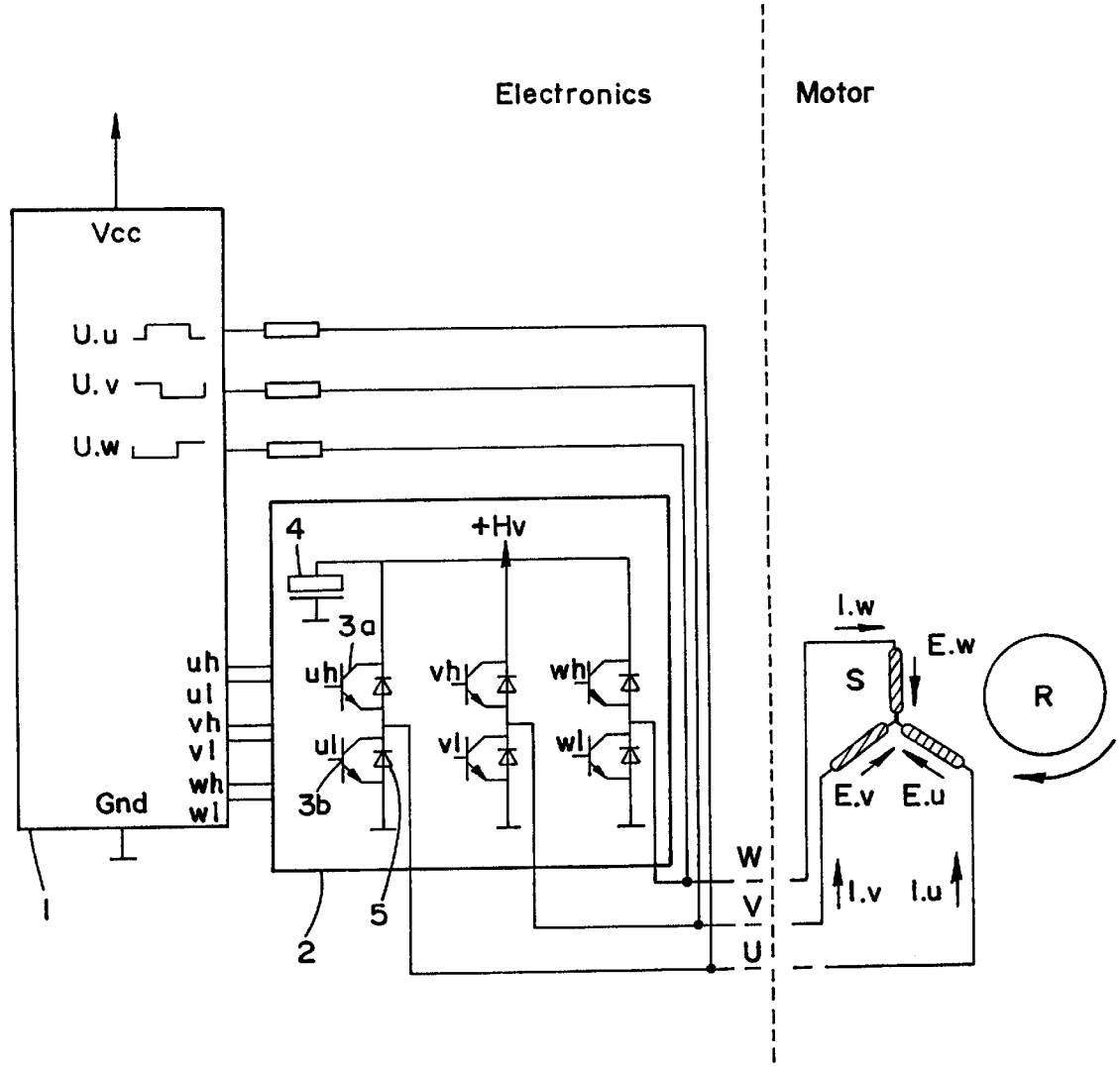
FIG. 3 shows a circuit arrangement for the actuation of a three-phase synchronous motor according to the present invention.

FIG. 3 shows the equivalent-circuit diagram of an electronically switched synchronous motor. The embodiment of FIG. 3 involves a three-line, six-pulse synchronous motor with permanent excitation. It should be expressly pointed out at this stage however that the present invention can basically be applied to all kinds of synchronous motor and the circuit arrangement described hereinafter is only a preferred embodiment given by way of example.

The synchronous motor has in its stator S three star-connected stator windings which are connected on the one hand at a star point and on the other hand respectively to a connecting terminal u, v, w of the motor. The synchronous motor further has a rotor which carries a permanent magnetic. The connecting terminals u, v, w are each further connected to the central tapping between an upper switching means 3a and a lower switching means 3b of the power bridge 2, which for example are in the form of power transistors.

The control connections of the power transistors 3a, 3b are electrically connected to the outputs uh, ul, vh, vl, wh, wl of a motor control 1, for example a microcontroller, wherein the control connections of the switching means 3a, 3b are preferably actuated by way of MOS-gate drivers (not shown).

Connected in parallel with the connections (Gnd and +HV) of a constant current source or an intermediate circuit inverter is an intermediate circuit capacitor 4 which serves as a smoothing capacitor for the intermediate circuit voltage +HV. In addition, connected in parallel with the switching means 3a, 3b is a respective free-running diode 5 with opposite forward direction.

In addition the terminal potentials U.u, U.v and U.w of the motor terminals u, v, w are respectively taken off at the centre tapping of the bridge arm 3a, 3b and passed by way of a suitable resistor to the motor control 1. As described hereinafter, the terminal potentials U.u, U.v, U.w detected in that way serve as input parameters for the detection of a current zero passage of the stator current and the phase position as between the stator current I.s and the induced emf E.s.

Figure 4:
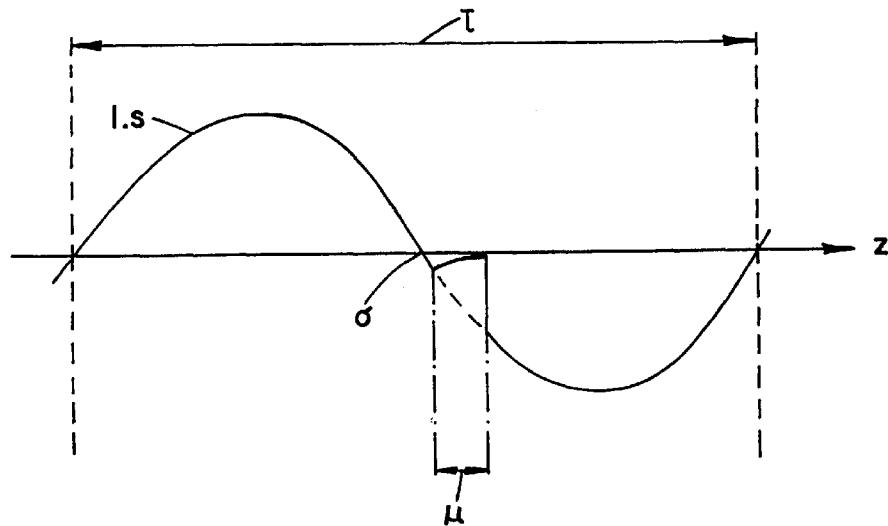
FIG. 4 is a diagrammatic view of the curve configuration of the stator current.

FIG. 4 now shows by way of example the sinusoidal or quasi-sinusoidal configuration of the stator current I.s as is obtained by pulse width modulated (PWM) control of the power transistors 3a, 3b in phase-shifted relationship in each stator winding of the synchronous motor.

As already mentioned in the opening part of this specification the production of a quasi-sinusoidal stator current I.s by a PWM-actuation arrangement is described in greater detail for example in "Digitale Steuerung eines Dreiphasen-Induktionsmotors" by B. Maurice et al in Design & Elektronik 8 of 07.04.1992, pages 40–46. In this case the control circuit has recourse to stored tables with values for the pulse duty factors of the bridge arms of the synchronous motor.

The use of a sinusoidal or quasi-sinusoidal stator current is desirable in particular in relation to rotary speeds as are required for example for washing machines or dryers in order to avoid the undesirable noises which occur when using a gappy stator current. When using a quasi-sinusoidal stator current however it is no longer possible, as in the case of the gappy stator current, to measure the emf induced in the stator winding in the current gap of the stator current and to use the measurement result to regulate the synchronous motor.

Therefore, as diagrammatically shown in FIG. 4, in the quasi-sinusoidal current configuration (broken line) the stator current I.s is set to zero (solid line) for a given period of time, that is to say an artificial current gap $\mu$ is produced, in which then the emf E.s induced in the respective stator winding can be measured. The duration of the sampling time $\mu$ is for example constant at 50 $\mu$s while the period duration $\tau$ of the quasi-sinusoidal stator current I.s, for example in the case of washing machines, is about 60 ms for the wash phase and about 3 ms for the spin phase. As the sampling time $\mu$ is very short in relation to the period duration $\tau$ of the current I.s, the current configuration and thus control of the synchronous motor is only immaterially influenced. The actual conditions are shown in greatly exaggerated form in FIG. 4 for enhanced clarity of the drawing.

So that the stator current I.s switches off or falls to the value zero as quickly as possible in order then to be able to measure the emf E.s induced in the stator winding, it is advantageous for the current gap $\mu$ to be provided as closely as possible to a current zero passage σ a of the stator current I.s. Advantageously, that occurs as directly as possible after a current zero passage σ as in that case, by monitoring of the current configuration, it is possible to detect such a current zero passage σ and directly afterwards produce an artificial current gap $\mu$.

Now, in the artificial current gap $\mu$ produced in that way, the emf E.s induced in the stator winding by virtue of rotation of the rotor is measured and, by means of the sign and optionally the magnitude of the emf E.s and the current zero passage, it is possible to determine the phase position between the emf E.s and the stator current I.s. Ascertainment of the phase position is advantageously effected in all stator windings of the multi-phase synchronous motor, whereby it is possible to achieve a higher degree of accuracy in terms of control.

Detection of a current zero passage σ, production of an artificial current gap $\mu$ and measurement of the induced emf E.s during the current gap $\mu$ will now be described with reference to FIGS. 5A to D by means of different operating conditions of the synchronous motor in detail. The description hereinafter relates in this respect to the three-line six-pulse synchronous motor shown in FIG. 3. It should be expressly pointed out once again at this stage however that the method can basically be applied to all kinds of synchronous motors.

FIGS. 5A to D respectively show in relation to a common time axis: a) the emf E.u induced in the stator winding u; b) the stator current I.u flowing in the stator winding u; c) the actuation signals uh and ul of the two switching means of the stator winding u; d) the terminal potential, U.u at the motor terminal u which is fed to the motor control as a control signal; e) the actuation signals vh and vl of the two switching means of the stator winding v; f) the terminal potential U.v at the motor terminal v which is fed to the motor control as a control signal; g) the actuation signals wh and wl of the two switching means of the stator winding w; and h) the terminal potential U.w at the motor terminal w which is fed to the motor control as a control signal. Shown in each case is only a narrow time window in the proximity of a zero passage of the stator current I.u of about some 100 $\mu$s. During that short period of time the quasi-sinusoidal configuration of the stator current I.u as such cannot be recognised and the emf E.u induced in the stator winding u can be assumed to be constant. In a similar manner the zero passages of the stator currents I.v and Iw in the other two stator windings v and w are preferably also monitored and the respective phase positions as between the induced emfs E.v and E.w and the stator current I.v and I.w respectively ascertained.

Figure 5A:
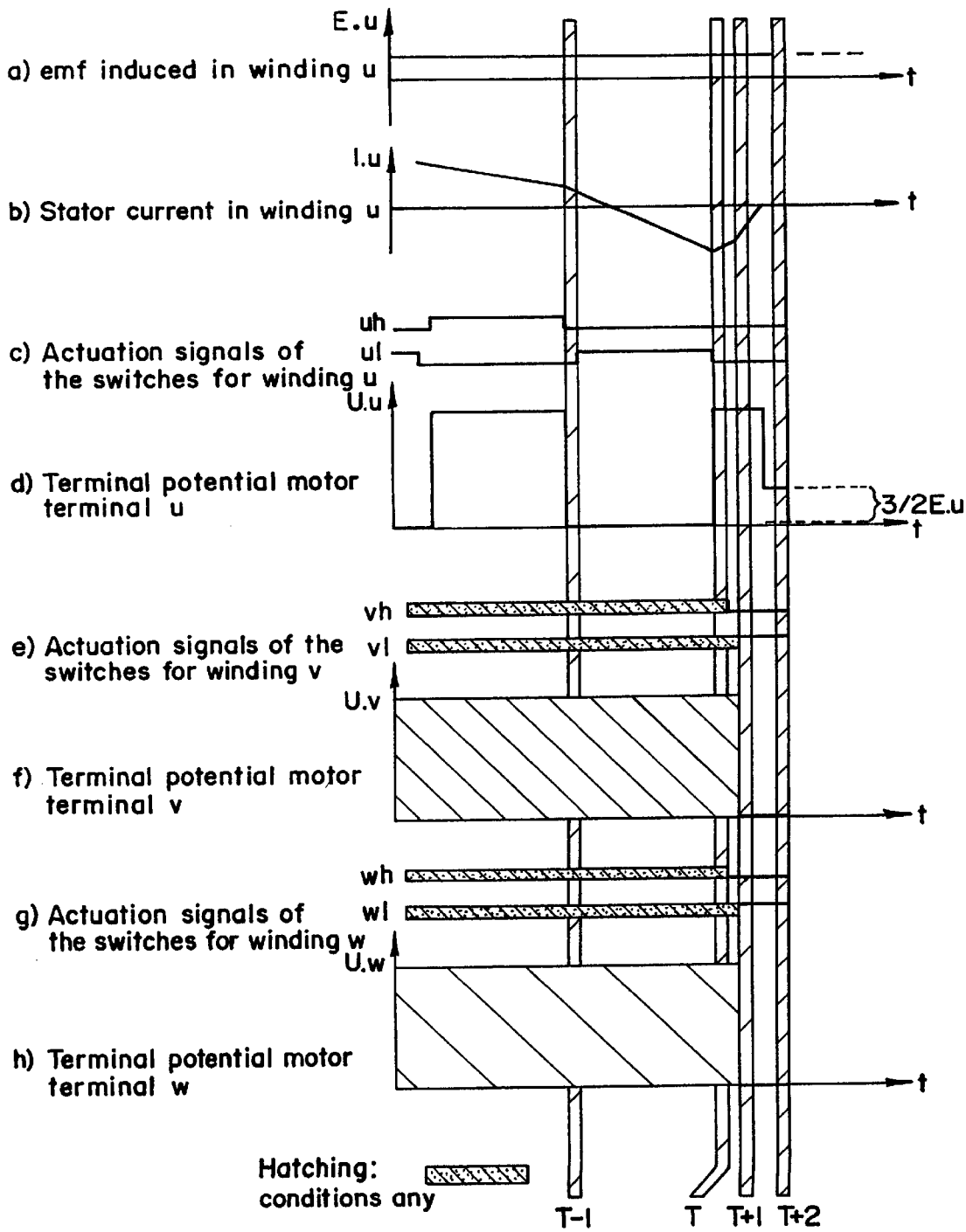
FIGS. 5A–D are a diagrammatic representation of the switching sequences of the actuating signals, the terminal voltages of the motor phases, the induced motor voltage and the stator current for four different cases to describe the method according to the invention.

FIG. 5A firstly shows the case of a negative current zero passage (change in sign of the stator current I.u from + to −), wherein the induced emf E.u is still positive. This means that the emf E.u and thus the rotor R lag the stator current I.u in the stator winding u.

To detect a zero passage of the stator current it is possible to provide in the current path of each stator winding a current measuring device which transmits the detected current measurement values to the motor control 1. In order however and in particular for reasons of cost to be able to forego additional electronic components of that nature detection of a zero passage in the stator current I.u is detected as follows:

Upon actuation of the power transistors 3a, 3b of a bridge arm, so-called dead times are interposed, during which neither the upper nor the lower power transistor is switched in a conducting condition. That is intended reliably to prevent overlapping switching of two switching means in a bridge arm, which would cause a short-circuit. During the dead times the voltage potential U.s at the corresponding phase or motor terminal u is determined by the current direction of the stator current I.s in the same phase.

When the stator current I.s flows into the stator winding the current switches during the dead time to the free-running diode 5 of the lower switching means 3b of the corresponding bridge arm and the potential U.s at the motor terminal of the corresponding phase corresponds to the negative pole of the voltage intermediate circuit, in this case Gnd. If in contrast the stator current I.s flows out of the stator winding, then the current switches during the dead time by way of the free-running diode 5 of the upper switching means 3a of the corresponding bridge arm to the positive pole of the voltage intermediate circuit (+HV). Upon a current zero passage the stator current changes its polarity and thus the voltage potential U.s also changes during the dead time at the corresponding motor terminal.

This is shown in FIG. 5A in the time intervals T−1 and T. During the first dead time (time interval T−1), in which both switching means 3a, 3b of the bridge arm associated with the motor terminal u are switched in a non-conducting condition (uh and ul OFF), the stator current I.u is positive and therefore flows into the stator winding u: It thus switches by way of the free-running diode 5 of the lower switching means 3b of the corresponding bridge arm to the negative pole (Gnd) of the voltage intermediate circuit. In the time interval T−1 a terminal potential U.u=Gnd is accordingly detected. After that dead time, in the time window shown in FIG. 5A, there is a negative zero passage of the stator current I.u, that is to say the stator current I.s changes its polarity from + to −. During the next dead time (time interval T) of that bridge arm the stator current I.u is thus negative and therefore flows out of the stator winding u. It now switches by way of the free-running diode 5 of the upper switching means 3a of the corresponding bridge arm to the positive pole (+HV) of the voltage intermediate circuit. Accordingly a terminal potential U.u=+HV is detected in the time interval T. In the two time intervals T−1 and T of the two directly successive dead times the terminal potential U.u therefore has opposing voltage potential, whereby the motor control 1 recognises that a zero passage of the stator current I.u has occurred between the two time intervals T−1 and T. As the terminal potential U.u has changed from Gnd to +HV in the time intervals T−1 and T, this case involves a negative current zero passage of the stator current I.u.

It is not absolutely necessary for the terminal potential U.u to be detected and evaluated during each dead time of the corresponding bridge arm. The more frequently however that the terminal potential U.u is detected and evaluated in the dead times, the more quickly is it possible to recognise a zero passage of the stator current I.s and the closer is it possible for an artificial current gap to be produced to such a current zero passage, whereby the length of the current gap or the change in current configuration can be shorter, as will be further described hereinafter.

In accordance with the invention the current zero passage of a stator current can therefore be detected both by means of suitable current measuring devices and also by detection of the change in the terminal potential between two dead times.

Immediately after detection of a current zero passage of the stator current I.u in the time interval T, in the time interval T+1 both switching means 3a, 3b of the bridge arm of the motor terminal u become non-conducting (uh and ul OFF) and the other two motor terminals v and w, independently of their preceding switching states, are switched to a common voltage potential, that is to say short-circuited. Desirably, for that purpose the two motor terminals v and w are connected by way of the switching means 3a, 3b of the associated bridge arms to the negative pole (Gnd) or the positive pole (+HV) of the voltage intermediate circuit.

In order to provide for rapid decay of the stator current I.u to the value zero, in the case of a negative current zero passage of the stator current I.u as shown in FIGS. 5A and B the two short-circuiting motor terminals v and w are switched in the time interval T+1 to the negative pole (Gnd) of the voltage intermediate circuit by closure of the respective lower switching means 3b (vl and wl ON). At a positive current zero passage of the stator current I.u in contrast, as shown in FIGS. 5C and D, the two short-circuiting motor terminals v and w, in the time interval T+1, are switched to the positive pole (+HV) of the voltage intermediate circuit by closure of the respective upper switching means 3a (vh and wh ON). As a result the stator current I.u must respectively start against the highest possible potential so that it switches down to the value zero in a correspondingly short time.

After the stator current I.u has decayed to the value zero (time interval T+2) the two switching means 3a, 3b of the motor terminal u remain switched in the non-conducting condition during measurement of the emf E.u induced in the stator winding u. Likewise the switching means 3a, 3b of the other two motor terminals v and w remain in their unchanged switching state during the time interval T+2 relative to the time interval T+1. The voltage potential U.u at the bridge point of the motor terminal u in relation to common potential (Gnd) of the other two motor terminals v and w is in this case precisely 3/2·E.u, as the considerations hereinafter show.

Figure 6:
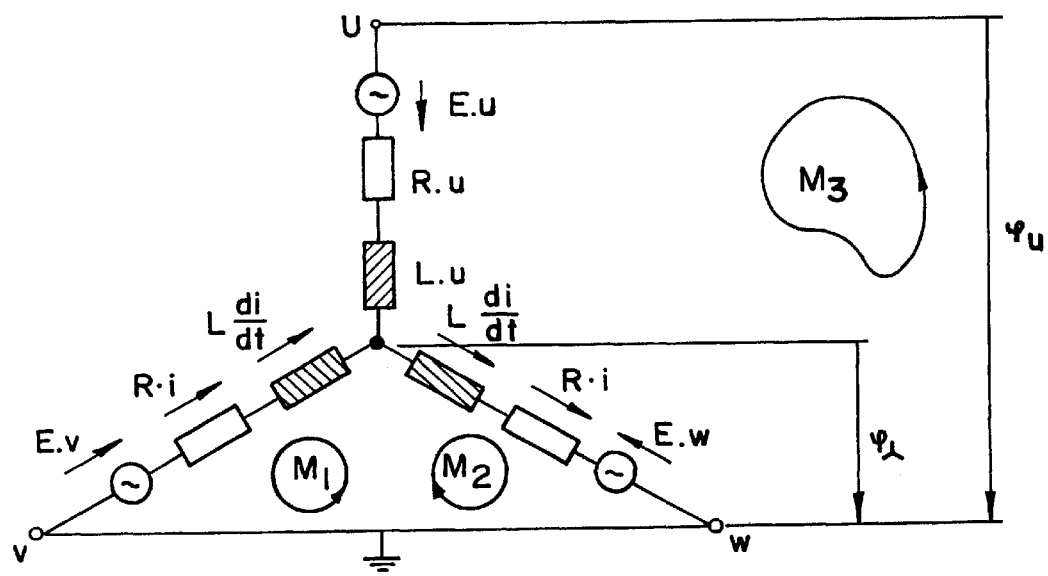
FIG. 6 is a diagrammatic view to describe detection of the induced emf.

FIG. 6 illustrates the conditions in the time interval T+2 for the situation shown in FIG. 5A, that is to say the two switching means 3a, 3b of the motor terminal u are switched in a non-conducting condition and no current flows in the stator winding u (I.u=0). In addition the two motor terminals v and w are connected together and switched to the negative potential (Gnd) of the voltage intermediate circuit.

As this arrangement involves a symmetrical, sinusoidal emf-system, the following applies:

$$E.u+E.v+E.w=0 \quad (1)$$

In addition the following relationships apply in the meshes $M_1$, $M_2$ and $M_3$:

$$M_1: \phi_Y=-L.v\cdot dI/dt-R.v\cdot I-E.v \quad (2)$$

$$M_2: \phi_Y=L.w\cdot dI/dt+R.w\cdot I-E.w \quad (3)$$

$$M_3: \phi_u=E.u+\phi_Y \quad (4)$$

wherein $\phi_Y$ is the potential at the star point in relation to Gnd and $\phi_u$ is the potential of the motor terminal u in relation to the common terminal potential (Gnd) of the motor terminals v and w, that is to say corresponds to the terminal potential U.u. On the assumption that the stator windings are of the same structure, that is to say L.v=L.w and R.v=R.w, it can be deduced that:

$$(2)+(3):\ 2\cdot\phi_Y = -E.v - E.w \quad (5)$$

$$(1)\ \text{in}\ (5):\ 2\cdot\phi_Y = E.u \Rightarrow \phi_Y = 1/2\cdot E.u \quad (6)$$

$$(6)\ \text{in}\ (4):\ \phi_u = E.u + 1/2\cdot E.u \Rightarrow \phi_u = 3/2 E.u \quad (7)$$

This means that in the time interval T+2, that is to say during the artificially generated current gap in the stator current I.u, by detection of the terminal potential U.u=$\phi_u$ at the motor terminal u it is possible directly to ascertain the emf E.u induced in the stator winding u.

If, as in the case shown in FIG. 5A, what is involved is a negative zero passage of the stator current I.u and a positive value of $\phi_u$ and E.u respectively, it directly follows therefrom that the emf E.u induced in the stator winding u lags behind the stator current I.u. If, besides the sign of the induced emf E.u, the absolute value thereof is also detected, it is additionally possible to deduce therefrom the degree of deviation of the phases as between E.u and I.u.

Regulation of the synchronous motor is now effected in such a way that the emf E.u induced in the stator winding u is taken if possible to the value zero, during the current gap in the stator current I.u. For example either the frequency with which the stator field is switched or the amplitude of the stator current I.u can be used as the control value for that regulation effect.

Figure 5B:
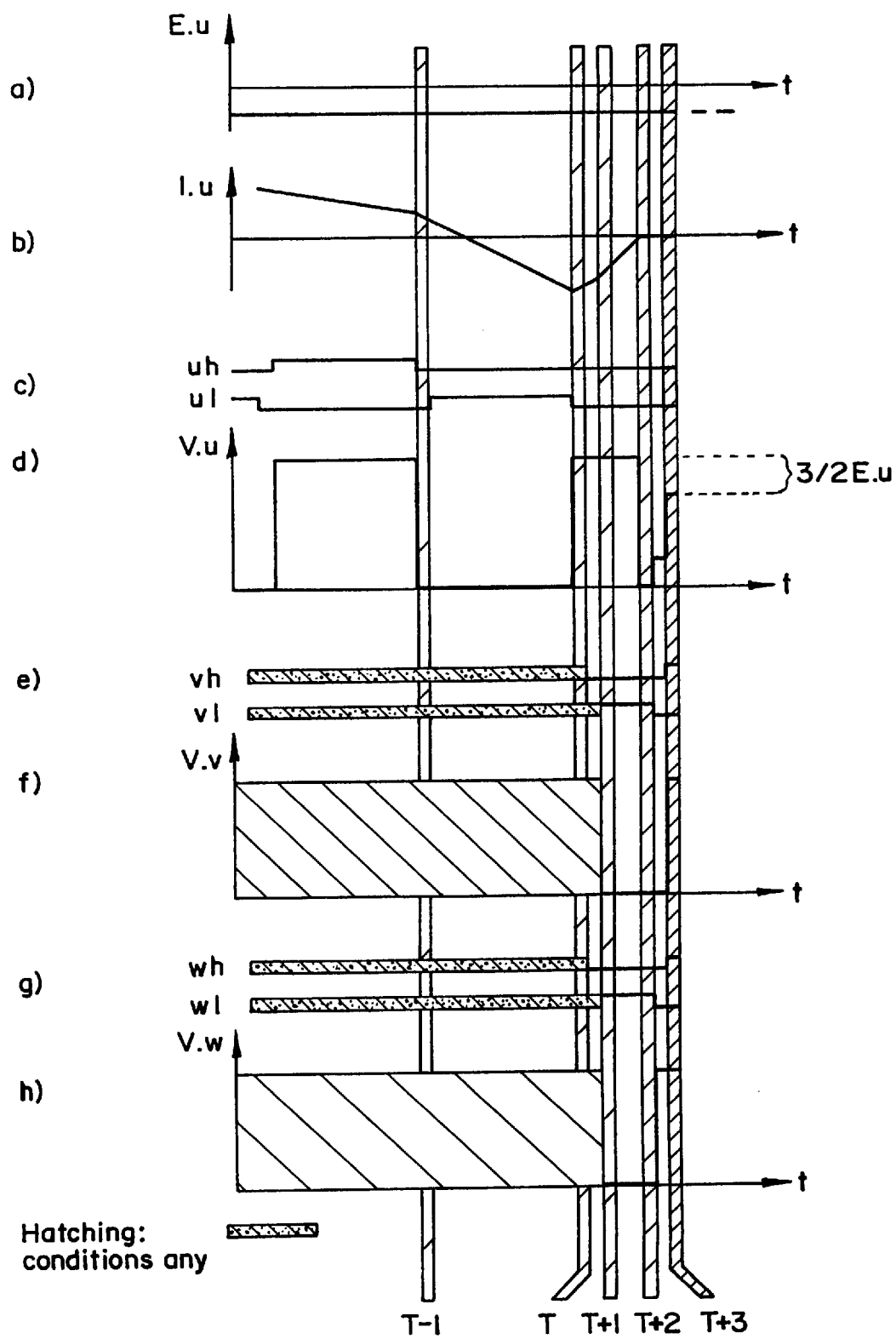
Figure 5C:
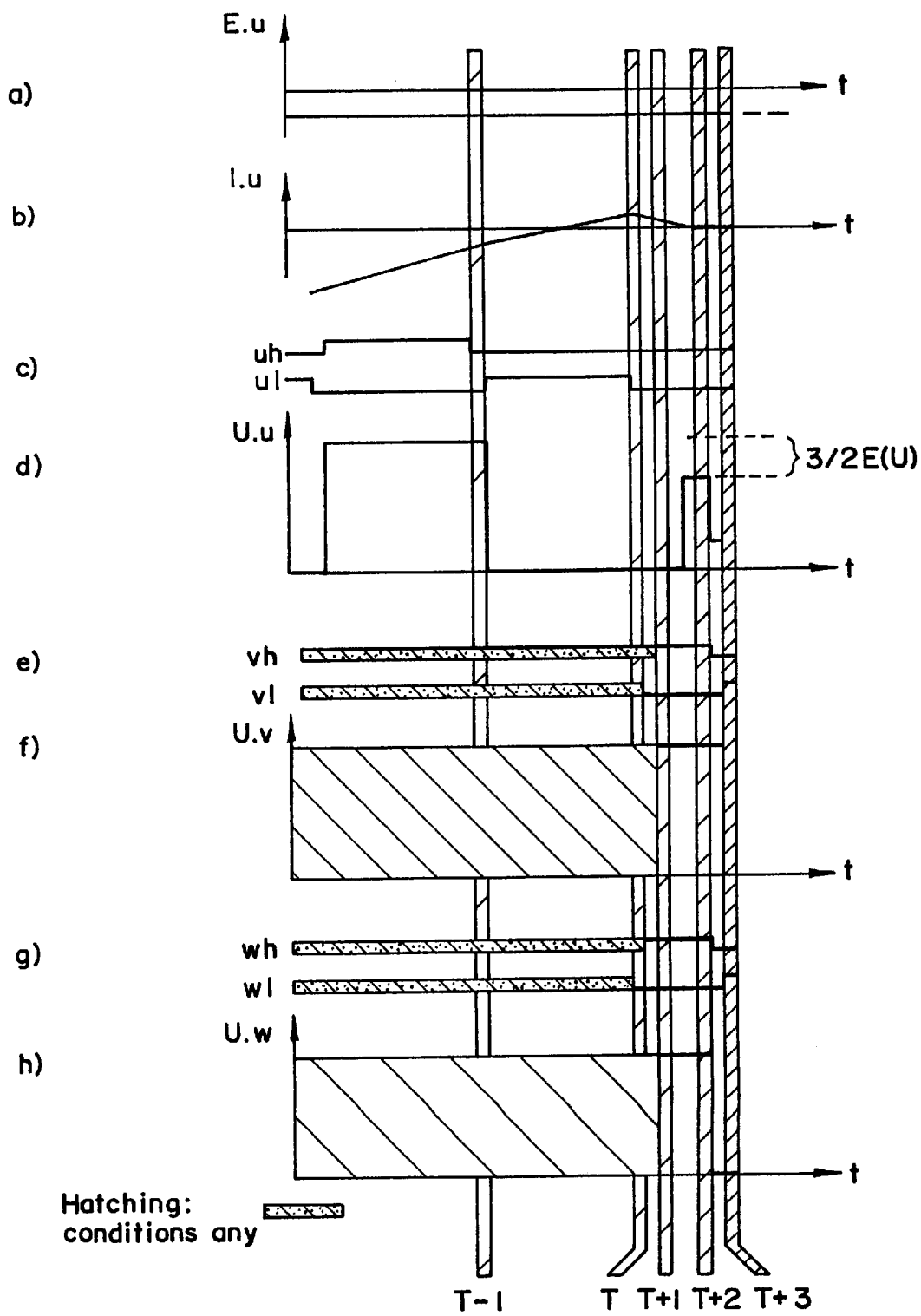

In contrast to FIG. 5A, FIG. 5B shows a case in which, at a negative current zero passage of the stator current I.u, the induced emf E.u is already negative, that is to say the emf E.u and thus the rotor lead the stator current I.u.

As in FIG. 5A, in this case also, during the dead time in the time interval T a negative current zero passage of the stator current I.u is detected between the two time intervals T−1 and T. The stator current I.u is then also switched down to the value zero insofar as in the time interval T+1 the two switching means 3a, 3b of the bridge arm of the motor terminal u are made non-conducting (uh and ul OFF) and the other two motor terminals v and w, independently of their preceding switching states, are jointly switched to the negative pole (Gnd) of the voltage intermediate circuit (vl and wl ON).

After decay of the stator current I.u, in the time interval T+2 the terminal potential U.u is measured at the motor terminal u in relation to the common terminal potential U.v=U.w=Gnd. In the configuration shown in FIG. 5B, there is a potential $\phi_u = -3/2\cdot E.u$. That potential $\phi_u$ however cannot be measured as it is held by the free-running diode 5 of the lower switching means 3b of the corresponding bridge arm of the stator winding u at Gnd. For that reason, it is necessary in this case for the bridge arms of the other two motor terminals v and w to be changed over to the supply potential +HV of the voltage intermediate circuit (vh and wh ON). Now, in the time interval T+3, at the bridge arm of the motor terminal u, it is possible to measure the potential $\phi_u = +HV - 3/2\cdot E.u$ from which the induced emf E.u can be directly ascertained.

FIG. 5C, in contrast to FIG. 5A, shows a situation in which, at a positive current zero passage of the stator current I.u, the induced emf E.u is still negative, that is to say the emf E.u and thus the rotor trail the stator current I.u.

As in FIG. 5A, this case also involves ascertaining during the dead time in the time interval T a current zero passage (in this case positive) of the stator current I.u between the two time intervals T−1 and T. The stator current I.u is then switched down to the value zero insofar as in the time interval T+1 the two switching means 3a, 3b of the bridge arm of the motor terminal u are made non-conducting (uh and ul OFF) and the other two motor terminals v and w, independently of their preceding switching states, are jointly switched to the positive pole (+HV) of the voltage intermediate circuit (vh and wh ON).

After decay of the stator current I.u in the time interval T+2 the terminal potential U.u at the motor terminal is measured in relation to the common terminal potential U.v and U.w respectively. The situation in FIG. 5C involves a potential $\phi_u = +HV - 3/2\cdot E.u$ which is more negative than the terminal potential U.v=U.w=+HV and from which the induced emf E.u can be directly ascertained.

Figure 5D:
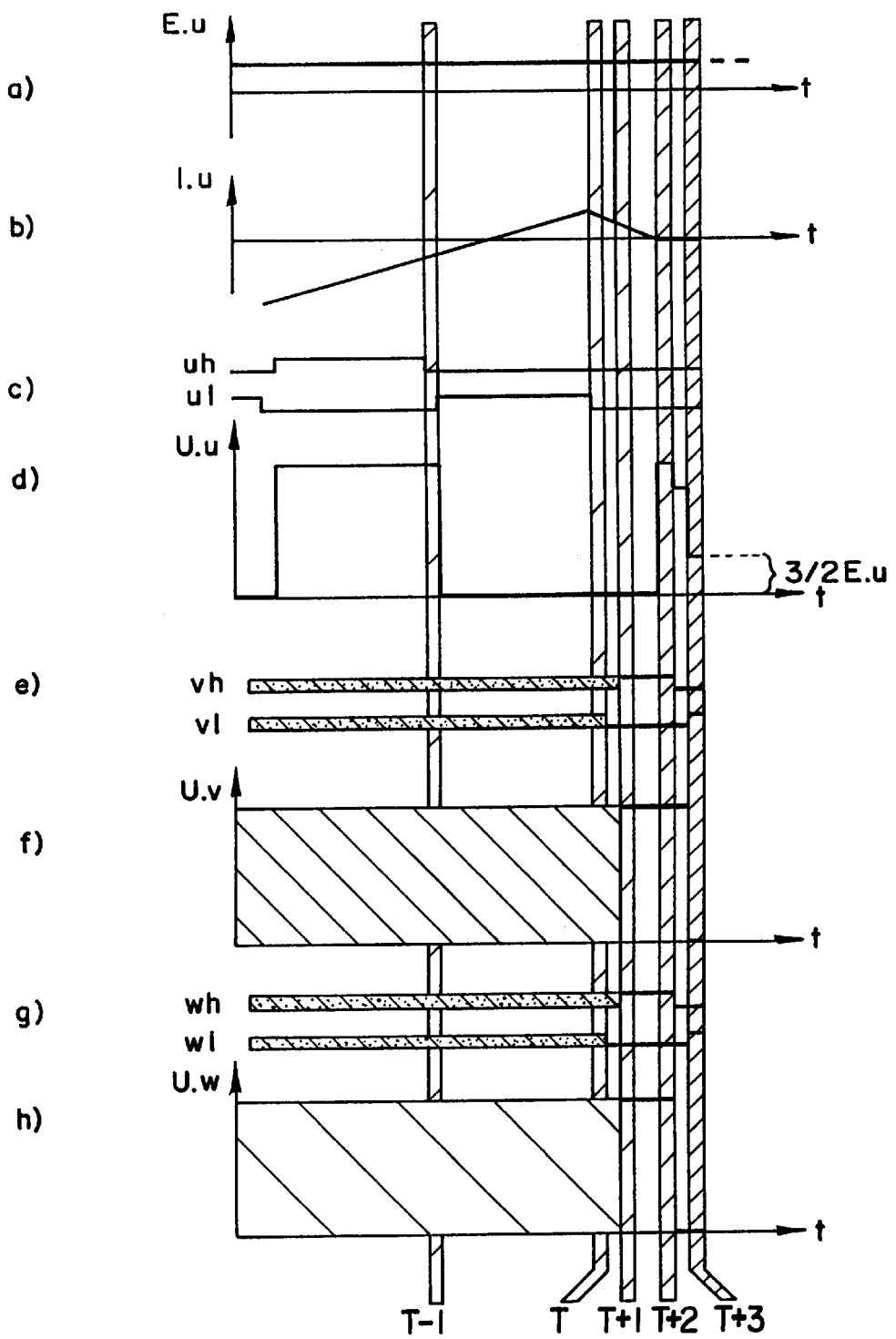

Lastly FIG. 5D shows a case in which at a positive current zero passage of the stator current I.u the induced emf E.u is already positive, that is to say the emf E.u and thus the rotor lead the stator current I.u.

As in FIG. 5C, this case also involves detecting during the dead time in the time interval T a positive current zero passage of the stator current I.u between the two time intervals T−1 and T. The stator current I.u is then also switched down to the value zero insofar as in the time interval T+1 the two switching means 3a, 3b of the bridge arm of the motor terminal u are made non-conducting (uh and ul OFF) and the other two motor terminals v and w, independently of their preceding switching states, are jointly switched to the positive pole (+HV) of the voltage intermediate circuit (vh and wh ON).

After decay of the stator current I.u, in the time interval T+2, the terminal potential U.u is measured at the motor terminal u in relation to the common terminal potential U.v=U.w=+HV. In the situation shown in FIG. 5D there is a potential $\phi_u = +HV + 3/2\cdot E.u$. This potential $\phi_u$ however cannot be measured as it is held by the free-running diode 5 of the upper switching means 3a of the corresponding bridge arm of the motor terminal u at the supply potential +HV. For that reason it is necessary in this case for the bridge arms of the upper two motor terminals v and w to be changed over to the base potential Gnd of the voltage intermediate circuit (vl and wl ON). Now, in the time interval T+3, at the bridge arm of the motor terminal u, it is possible to measure the potential $\phi_u = +3/2\cdot E.u$ from which the induced emf E.u can be directly ascertained.

Upon detection of the terminal potential U.u during the current gap in the stator current I.u (time interval T+2 and T+3 respectively), as described with reference to FIGS. 5A to D, it is not only the sign/polarity of the induced emf E.u that is evaluated, but also the magnitude/amplitude of E.u for example by way of an A/D-converter provided in the motor control 1. In that way the current phase shift between stator current I.u and induced emf E.u can be deduced and powerful and efficient regulation of the synchronous motor can be achieved.

In contrast thereto, it is also possible, as a configuration of the regulator which is simpler from the circuit engineering point of view, to operate without amplitude detection in respect of the induced emf E.u and to evaluate only the signs thereof. In that case, to measure the induced emf E.u, the short-circuiting stator windings v, w are in each case clamped to the negative pole (Gnd) of the voltage intermediate circuit (vl and wl ON).

If the induced emf E.u is positive, then the terminal potential U.u measured at the open motor terminal u is also positive (U.u=+3/2·E.u), as is the case in the time interval T+2 in FIG. 5A and in the time interval T+3 in FIG. 5D. If in contrast the induced emf E.u is negative, then the negative terminal potential U.u (U.u=+3/2·E.u) is clamped by way of the associated free-running diode 5 of the lower switching means 3b of the corresponding bridge arm to the negative pole (Gnd) of the voltage intermediate circuit, as is the case in the time interval T+2 in FIG. 5B and in the time interval T+3 in FIG. 5C. For this reason the magnitude of the negative terminal potential U.u in relation to the negative pole (Gnd) of the voltage intermediate circuit corresponds at a maximum to the diode forward voltage of about 1 V.

With this simplified regulation of the synchronous motor the motor control 1 interrogates the detected voltage potentials U.u, U.v, U.w only for greater or smaller than the ground potential (Gnd). If the induced emf E.u is substantially greater than the supply voltage (Vcc) of the motor control 1, which is the case with most uses on a low-voltage network, the motor control 1 can also more easily interrogate the detected voltage potentials U.u, U.v, U.w for greater or smaller than Vcc/2.

What is claimed is:

1. A method of determining the instantaneous rotary position of the rotor of a synchronous motor in relation to the rotating magnetic stator field comprising the steps of:
   measuring an induced voltage in at least one star connected stator winding, where each star point terminal is connected to oppositely located central tap-offs of a power bridge formed of two power transistors,
   through alternating pulse width modulated switching of said two power transistors quasi-continuously supplying said power transistors with a current, which is generally sinusoidal over a period of time,
   and during the zero passage of the current flow through the instantaneously currentless phase winding, the current induced from the rotating rotor at the terminal of this winding still produces a voltage, which is measured relative to the common terminal potential at the other windings which are transiently interconnected therewith for this purpose.

2. A method according to claim 1 characterised in that the short-circuiting stator windings are jointly connected to the negative pole (Gnd) or the positive pole (+HV) of the voltage intermediate circuit.

3. A method according to claim 2 characterised in that the short-circuiting stator windings are switched to the positive pole (+HV) of the voltage intermediate circuit at a detected positive current zero passage and to the negative pole (Gnd) of the voltage intermediate circuit at a detected negative current zero passage.

4. A method according to claim 1 characterised in that only the sign of the voltage (E.s) induced in the stator winding is detected.

5. A method according to claim 1 characterised in that the sign and the amplitude of the voltage (E.s) induced in the stator winding are detected.

6. A method according to claim 1, wherein both of the power transistors arranged in a winding are alternatively switched in a bridge circuit at a short timewise offset,
   the terminal voltage being observed at a switching of the transistors occurring in sequence so that the beginning of a resulting dead time in said winding,
   said power transistors being subjected to a change in potential when the winding current since the preceding dead time evinced a zero current flow whereupon the again rising winding current is transiently interrupted by the power transistors of the bridge circuit, so as to presently measure the induced voltage in said winding.

7. A method according to claim 1, wherein upon the recognition of a zero current in a stator winding, for the measuring of the induced voltage in said stator winding, said again rising voltage with reversed polarity is interrupted by opening both said power transistors in said bridge circuit, and through the closing together of the other winding terminals to the interim voltage with the polarity of the current flow which is to be interrupted, is transitorily rapidly reconveyed to zero.

8. A method according to claim 6, wherein upon the recognition of a zero current in a stator winding, for the measuring of the induced voltage in said stator winding, said again rising voltage with reversed polarity is interrupted by opening both said power transistors in said bridge circuit, and through the closing together of the other winding terminals to the interim voltage with the polarity of the current flow which is to be interrupted, is transitorily rapidly reconveyed to zero.

9. A method according to claim 6 characterised in that detection of the voltage (E.s) induced by the rotor is effected in each stator winding of the synchronous motor.

10. A method of detecting a zero passage of a stator current (I.s) which changes in sign of a synchronous motor comprising the following method steps:
    detection of the terminal potential (U.s) during a dead time (T−1) of actuation of the corresponding stator winding;
    detection of the terminal potential (U.s) during a subsequent dead time (T) of actuation of the corresponding stator winding:
    comparison of the terminal potentials (U.s) detected during the two dead times (T−1, T) and detection of a zero passage of the stator current (I.s) between the two dead times (T−1, T) upon a change in the terminal potential.

\* \* \* \* \*